(12) United States Patent
Lerzer et al.

(10) Patent No.: US 8,543,158 B2
(45) Date of Patent: Sep. 24, 2013

(54) TECHNIQUE FOR PROVIDING NETWORK ACCESS TO DIFFERENT ENTITIES

(75) Inventors: Jürgen Lerzer, Neumarkt/OPf (DE); Morten Christiansen, Arendal (NO); Marcus Mertens, Nürnberg (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 198 days.

(21) Appl. No.: 12/809,567

(22) PCT Filed: Dec. 18, 2008

(86) PCT No.: PCT/EP2008/067840
§ 371 (c)(1),
(2), (4) Date: Oct. 31, 2010

(87) PCT Pub. No.: WO2009/080685
PCT Pub. Date: Jul. 2, 2009

(65) Prior Publication Data
US 2011/0034162 A1 Feb. 10, 2011

Related U.S. Application Data

(60) Provisional application No. 61/016,460, filed on Dec. 22, 2007.

(30) Foreign Application Priority Data

Dec. 21, 2007 (EP) .................................... 07025057

(51) Int. Cl.
*H04M 1/00* (2006.01)
(52) U.S. Cl.
USPC ...................... 455/553.1; 455/556.1; 455/558

(58) Field of Classification Search
USPC ............. 455/422.1, 436, 552.1, 553.1, 556.1, 455/556.2, 557, 558, 559; 370/331
See application file for complete search history.

(56) References Cited

U.S. PATENT DOCUMENTS 5,327,483 A * 7/1994 Kikuchi ........................ 455/462
5,890,074 A * 3/1999 Rydbeck et al. .............. 455/558
(Continued)

FOREIGN PATENT DOCUMENTS

| CN | 1947377 A | 4/2007 |
|---|---|---|
| EP | 1 827 038 A2 | 8/2007 |

(Continued)

OTHER PUBLICATIONS

PCT International Search Report, mailed Mar. 11, 2009, in connection with International Application No. PCT/EP2008/067840.

(Continued)

*Primary Examiner* — Christopher M Brandt
(74) *Attorney, Agent, or Firm* — Potomac Patent Group PLLC

(57) ABSTRACT

A technique for selectively providing network access to various components is described. A modem device for realizing this technique comprises a first platform module adapted to support network access via a Radio Access Technology (RAT). The first platform module comprises a first data interface. The apparatus further comprises a second data interface adapted to be coupled to a second platform and a third data interface adapted to be coupled to an external device. A switching mechanism selectively couples the first data interface to the second data interface to provide network access, via the second platform module, to an application residing on the apparatus. The switching mechanism may further couple the first data interface to the third data interface to provide network access to the external device.

22 Claims, 7 Drawing Sheets

(56) References Cited

U.S. PATENT DOCUMENTS

| | | | |
|---|---|---|---|
| 6,526,034 B1* | 2/2003 | Gorsuch | 370/338 |
| 6,628,652 B1* | 9/2003 | Chrin et al. | 370/386 |
| 6,987,985 B2* | 1/2006 | Purkayastha et al. | 455/552.1 |
| 7,506,077 B2* | 3/2009 | Hesse | 710/8 |
| 7,908,335 B1* | 3/2011 | Citterelle et al. | 709/212 |
| 2002/0173338 A1* | 11/2002 | Neumann et al. | 455/552 |
| 2003/0070032 A1* | 4/2003 | Tsao et al. | 710/313 |
| 2003/0212841 A1* | 11/2003 | Lin | 710/62 |
| 2006/0053238 A1* | 3/2006 | Hung et al. | 710/62 |
| 2006/0080490 A1* | 4/2006 | Tang | 710/313 |
| 2006/0217071 A1* | 9/2006 | Russo et al. | 455/66.1 |
| 2007/0033308 A1* | 2/2007 | Teng et al. | 710/62 |
| 2007/0173283 A1 | 7/2007 | Livet et al. | |
| 2008/0005262 A1* | 1/2008 | Wurzburg et al. | 709/217 |
| 2008/0222341 A1* | 9/2008 | Lin et al. | 710/316 |
| 2011/0090865 A1* | 4/2011 | Lerzer et al. | 370/331 |

FOREIGN PATENT DOCUMENTS

| | | | |
|---|---|---|---|
| WO | 00/22857 A | 4/2000 | |
| WO | 00/41082 A2 | 7/2000 | |
| WO | 2006/108174 A2 | 10/2006 | |

OTHER PUBLICATIONS

USB Implementers Forum: "On-The-Go Supplement to the USB 2.0 Specification—Revision 1.3" Dec. 5, 2006, XP002479921.

Ghosh, A. et al. "Open application environments in mobile devices: Focus on JME and Ericsson Mobile Platforms" Ericsson Review, [Online] vol. 82, No. 1, Dec. 19, 2005, pp. 82-91, XP002484529, ISSN: 0014-0171. Retrieved from the Internet: URL:http://www.ericsson.com/ericsson/corpinfo/publications/review/2005_02/files/200502.pdf> [retrieved on Jun. 10, 2008].

Article 94(3) EPC Communication, dated Apr. 28, 2010, in connection with European Application No. 07025057.6-2212.

Chinese Office Action, dated Aug. 31, 2012, in connection with counterpart Chinese Patent Application No. 200880127092.2.

Translation of Chinese Office Action, dated Aug. 31, 2012, in connection with counterpart Chinese Patent Application No. 200880127092.2.

Decision to Refuse European Patent Application, dated Oct. 23, 2012, in connection with counterpart European Patent Application No. 07 025 057.6.

Oral Proceeding Minutes in Accordance with Rule 124(4) EPC, dated Oct. 23, 2012, in connection with counterpart European Patent Application No. 07 025 057.6.

* cited by examiner

User data paths through the system for mobile applications use case:

User data paths through the system for USB Ethernet use case:

User data paths through the system for mobile applications use case:

User data paths through the system for USB Ethernet use case:

TECHNIQUE FOR PROVIDING NETWORK ACCESS TO DIFFERENT ENTITIES

CROSS-REFERENCE TO RELATED APPLICATIONS

This application claims priority under 35 U.S.C. §119 to European Patent Application No. 07025057.6, filed Dec. 21, 2007, which is hereby incorporated herein by reference in its entirety. This application also claims the benefit of U.S. Provisional Application No. 61/016,460, filed Dec. 22, 2007, which is hereby incorporated herein by reference in its entirety.

TECHNICAL FIELD

The present invention generally relates to the provision of network access via Radio Access Technologies (RATs). Specifically, the invention relates to a technique that permits a first platform module to selectively provide network access to different entities such as an external device and a second platform module co-located with the first platform module.

BACKGROUND

Mobile telephones have traditionally been voice-centric devices with proprietary operating systems handling all communication tasks. The Application Programming Interfaces (APIs) in these devices were not made available to third-party developers. As a consequence, end users were dependent on the device manufacturers for applications.

Today, the mobile communications industry is increasingly becoming aware of the importance and benefits of open application environments for mobile devices. Basically, an open application environment permits the installation of third party applications on the mobile device during device manufacture or later on by a user operating the device. Such third party applications may include games, software upgrades, etc.

A. Ghosh et al., "Open application environments in mobile devices: Focus on JME and Ericsson Mobile Platform modules", Ericsson Review No. 2, Vol. 82, 2005, pages 82 to 91 (ISSN: 0014-0171) describe an exemplary open application environment for mobile devices. The open application environment is based on a mobile platform module with a digital baseband processor supporting one or more RATs such as General Packet Radio Service (GPRS), Enhanced Data for GSM Evolution (EDGE) or Wideband Code-Division Multiple Access (WCDMA). The mobile platform module is an environment that includes all the necessary integrated circuits and software needed to provide wireless network access services and communication services (e.g. for voice, data or multimedia applications), as well as interfaces to make these services available to applications residing within or logically on top of the mobile platform module.

Conventionally, mobile platform modules often included proprietary Operating Systems (OS). Now, with the advent of the open application environment, an application platform module with a third-party application processor will be added to the mobile device when it is desired to run an open OS such as Symbian. The application platform module will be co-located with the mobile platform module in the mobile device and handle applications including, for example, multimedia applications. The mobile platform module, on the other hand, will be in charge of a reduced set of functionalities (including all mobile communication tasks such as providing wireless network access) and mainly act as a network access platform module. Between the application platform module and the mobile platform module an interface mechanism provides the applications on the application platform module with access to platform module-internal functionalities of the mobile platform module as if the applications resided directly on or within the mobile platform module.

As wireless access points supporting different kinds of RATs are becoming ubiquitous, it is only a logical consequence that many mobile platform modules will provide support for more than one RAT. From the perspective of modularity it is sometimes desirable to co-locate in one mobile device two or more platform modules each supporting a different RAT. Such a modular approach facilitates re-using a mobile platform module either in a stand-alone configuration or in any combination with other mobile platform modules.

WO-A-00/22857 teaches a modular approach in which different network access modules (such as a Local Area Network (LAN) module and a Global System for Mobile communications (GSM) module) are interconnected via a communication bus according to the Universal Serial Bus (USB) standard. Other modules connected to the communication bus such as a Closed-Circuit Television (CCTV) module may then selectively transmit signals via the LAN module on the one hand or via the GSM module on the other.

Mobile platform modules are often incorporated in devices with modem functionalities (such as network cards) that provide wireless network access to terminal devices (such as personal computers or laptops). The modem devices may support two or more different RATs to ensure the availability of network access in various environments. Due to modularity considerations, two or more different mobile platform modules may therefore concurrently be installed within the modem device.

SUMMARY

Accordingly, there is a need for a technique for selectively coupling a first mobile platform to at least one of an external device and a second platform module co-located with the first platform module.

According to a first aspect, this need is satisfied by an apparatus for providing network access, the apparatus comprising a first platform module adapted to support network access via a first RAT and comprising a first data interface. The apparatus further comprises a second data interface adapted to be coupled to a second platform module, a third data interface adapted to be coupled to an external device, and a first switching mechanism adapted to selectively couple the first data interface to at least one of the second data interface to provide network access, via the second platform module, to an application residing on the apparatus, and the third data interface to provide network access to the external device.

By selectively coupling the first data interface, depending on the use case, to at least one of the external device and the second platform module, the internal construction of one or more of the platform modules can be simplified. In some cases, one or more inter-platform data interfaces may even be rendered obsolete.

The apparatus may be a finished product suitable for sale to an end customer or, in the alternative, a semi-finished product. The finished product comprises both the first platform module and the second platform module. The semi-finished product may not yet comprise the second platform module but a contacting structure to receive the second platform module. Such a contacting structure may include a socket, solder bumps, or the like.

In one implementation, at least one of the platform modules is adapted to be reused in different configurations according to a modular approach. The platform module may, for example, be configured such that it can be used either in a stand-alone configuration or, in the alternative, in a dual (or triple etc.) mode configuration. In the latter case, two or more platform modules will be co-located in one and the same apparatus and configured to communicate with each other. That is, each platform module may comprise one or more interfaces configured to be coupled to one or more further platform modules.

The apparatus may further comprise one or more controllers for implementing switching control mechanisms. In one implementation, the apparatus includes a first control mechanism adapted to detect whether or not the external device is connected to the apparatus via the third data interface. The first switching mechanism may then be controlled dependent on a result of this detection. If the presence of the external device is detected, the first data interface may, for example, be coupled to the third interface. On the other hand, if no external device is present, the first data interface may either remain unconnected, or it may be coupled to the second data interface.

The apparatus may further comprise a second switching mechanism adapted to couple the second data interface to the third data interface. Similar to the first switching mechanism, also the second switching mechanism may be controlled by the first control mechanism dependent on whether or not presence of an external device can be detected.

The second switching mechanism may further be adapted to selectively switch the second data interface from the third data interface to the first data interface and vice versa. In the case the second platform module is adapted to support network access via at least one second RAT, a second control mechanism may be provided that is adapted to determine availability of network access via at least one of the first RAT and the second RAT, and to control the first switching mechanism and the second switching mechanism dependent on a result of this determination.

An optional third control mechanism is adapted to control the second switching mechanism to couple the second data interface to the third data interface and to control the first switching mechanism to couple the first data interface to the third data interface. In such a coupling state of the data interfaces, the application residing on the apparatus may be provided with network access via the first RAT such that any network traffic between the first data interface and the second data interface to and from the application is routed through the external device.

As mentioned above, each platform module will comprise at least one (and in one implementation exactly one) data interface. In addition to the one or more data interfaces, each platform module may comprise a control interface for inter-platform control signalling. In one variation, the control interfaces are additionally adapted for the transfer of network traffic between the platform modules. In such a case, network traffic between the inter-platform control interfaces may be enabled when the first data interface is coupled to the third data interface so as to provide concurrent network access, via the first RAT, to the external device on the one hand and to the second platform module on the other.

Especially in cases with concurrent network access, the apparatus may further comprise a network traffic splitter/combiner that is located between the first interface, the application residing on the apparatus and the external device. The network traffic splitter/combiner may be in charge of combining network traffic from the external device and from the second platform module towards the network, and of splitting network traffic from the network such that the network traffic associated with the external device is routed to the external device, and the network traffic associated with the second platform module is routed to the second platform module.

The apparatus may additionally comprise a switching hub. The switching hub may comprise the second data interface, the third data interface and a fourth data interface. The fourth data interface is adapted to be coupled to the first data interface of the first platform module, and the second data interface may be adapted to be coupled to a corresponding fifth data interface which belongs to the second platform module.

The individual interfaces of the switching hub may be realized in the form of upstream or downstream ports. In one example, the fourth data interface is realized as a downstream port, the second data interface is also configured as a downstream port, and the third data interface is configured as an upstream port. Moreover, the switching hub may comprise a sixth data interface that may be configured as an upstream port adapted to be also coupled to the first data interface of the first platform module.

The switching hub may realize one or more of the switching mechanisms discussed herein. Moreover, the hub may comprise a control interface for receiving control instructions in accordance with any of the control mechanisms discussed herein. Alternatively, the hub may include an internal controller.

The switching hub may be integrated together with at least the first platform module and one or more of the switching mechanisms in an Application Specific Integrated Circuit (ASIC). Alternatively, the hub may be realized, optionally together with one or more of the switching mechanisms, in a first integrated circuit, and the first platform module as well as the second platform module may each be realized in the form of a further integrated circuit.

The first data interface of the first platform module (and/or, optionally, the corresponding data interface of the second platform module) may be selectively operable in a device (or downstream) mode and in a host (or upstream) mode. The switching between the device mode and the host mode may be controlled by a fourth control mechanism. The fourth control mechanism is adapted to operate the first data interface in the host mode when the first data interface is coupled, via the second data interface, to the application. Otherwise, for example when the first data interface is coupled via the third data interface to the external device, the first data interface will be operated in the device mode.

The various data interfaces discussed herein may operate in accordance with one of a plurality of interface standards. As one example, the USB standard can be mentioned. In the USB case, the data interfaces may be configured to present the apparatus as a USB network card to the external device. Additionally, or in the alternative, to presenting the apparatus as a network card to the external device, other platform services provided by the first and/or the second mobile platform may be presented to the external device as well. Such services may include mass storage functionalities, object exchange (OBEX) functionalities, device management functionalities, audio/video/multimedia functionalities, and the like.

The first platform module may comprise a digital baseband processor configured in accordance with the first RAT. In a similar manner, the second platform module, when adapted to support network access via a second RAT, may also comprise a digital baseband processor configured in accordance with the second RAT. In such a case the second platform module can be regarded as representing a further mobile platform module. However, the second platform module may also be realized as an application platform module, and in this case the second platform module may comprise an application processor.

The apparatus may generally be configured as a stationary device or as a mobile device. As for a mobile realization, the apparatus may be configured as at least one of a mobile terminal (such as a Personal Digital Assistant, or PDA), a mobile telephone and a network card. Alternatively, the apparatus may be configured as an ASIC for use in a mobile terminal, a mobile telephone or a network card.

The external device may be configured as a personal computer, as a laptop, or as another stationary or mobile device. The device may be configured to be removably connected to the apparatus via a cable or via a short-range wireless communication technology such as Bluetooth or any Wireless Local Area Network (WLAN) standard such as the IEEE 802.11 suite.

According to a still further aspect, a method of providing network access is proposed, wherein the method comprises the steps of providing, at a first data interface of a first platform module, network access via a RAT supported by the first platform module, and of selectively coupling the first data interface to at least one of a second data interface to provide network access, via a second platform module coupled to the second data interface, to an application residing on the apparatus, and a third data interface to provide network access to an external device coupled to the third interface.

The method may further comprise detecting the presence of the external device at the third data interface and, responsive to this detection, coupling the first data interface to the third data interface. The method may also comprise receiving a network access request from the second platform module, and coupling the first data interface to the second data interface in response to receipt of the network access request. When the first data interface is coupled to the third data interface, the second data interface may be coupled to the third data interface, so as to provide the application residing on the apparatus with network access via the first RAT. In such a case network traffic between the first data interface and the second data interface may be routed through the external device.

The techniques presented herein may be realised in the form of software, in the form of hardware, or using a combined software/hardware approach. As regards a software aspect, a computer program product comprising program code portions for performing the steps presented herein when the computer program product is run on one or more computing devices is provided. The computer program product may be stored on a computer-readable recording medium such as a memory chip, a CDROM, a hard disk, and so on.

BRIEF DESCRIPTION OF THE DRAWINGS

Further aspects and advantages of the techniques presented herein will become apparent from the following description of preferred embodiments and the drawings, wherein.

DESCRIPTION OF PREFERRED EMBODIMENTS

In the following description of preferred embodiments, for purposes of explanation and not limitation, specific details are set forth (such as particular interfaces, network access technologies and sequences of steps) in order to provide a thorough understanding of the present invention. It will be apparent to one skilled in the art that the present invention may be practiced in other embodiments that depart from these specific details. For example, while the embodiments will primarily be described in context with third and fourth generation mobile communications standards such as the Universal Mobile Telecommunications System (UMTS) and Long Term Evolution (LTE) standards, respectively, it will be evident that the present invention can also be practiced in connection with a second generation mobile communications technology according to, for example, the GSM standard.

Moreover, those skilled in the art will appreciate that the services, functions and steps explained herein below may be implemented using software functioning in conjunction with a programmed micro processor, an Application Specific Integrated Circuit (ASIC), a Digital Signal Processor (DSP) or a general purpose computer. It will also be appreciated that while the following embodiments will primarily be described in context with methods and devices, the invention may also be embodied in a computer program product as well as in a system comprising a computer processor and a memory coupled to the processor, wherein the memory is encoded with one or more programs that may perform the services, functions and steps disclosed herein.

Figure 1:
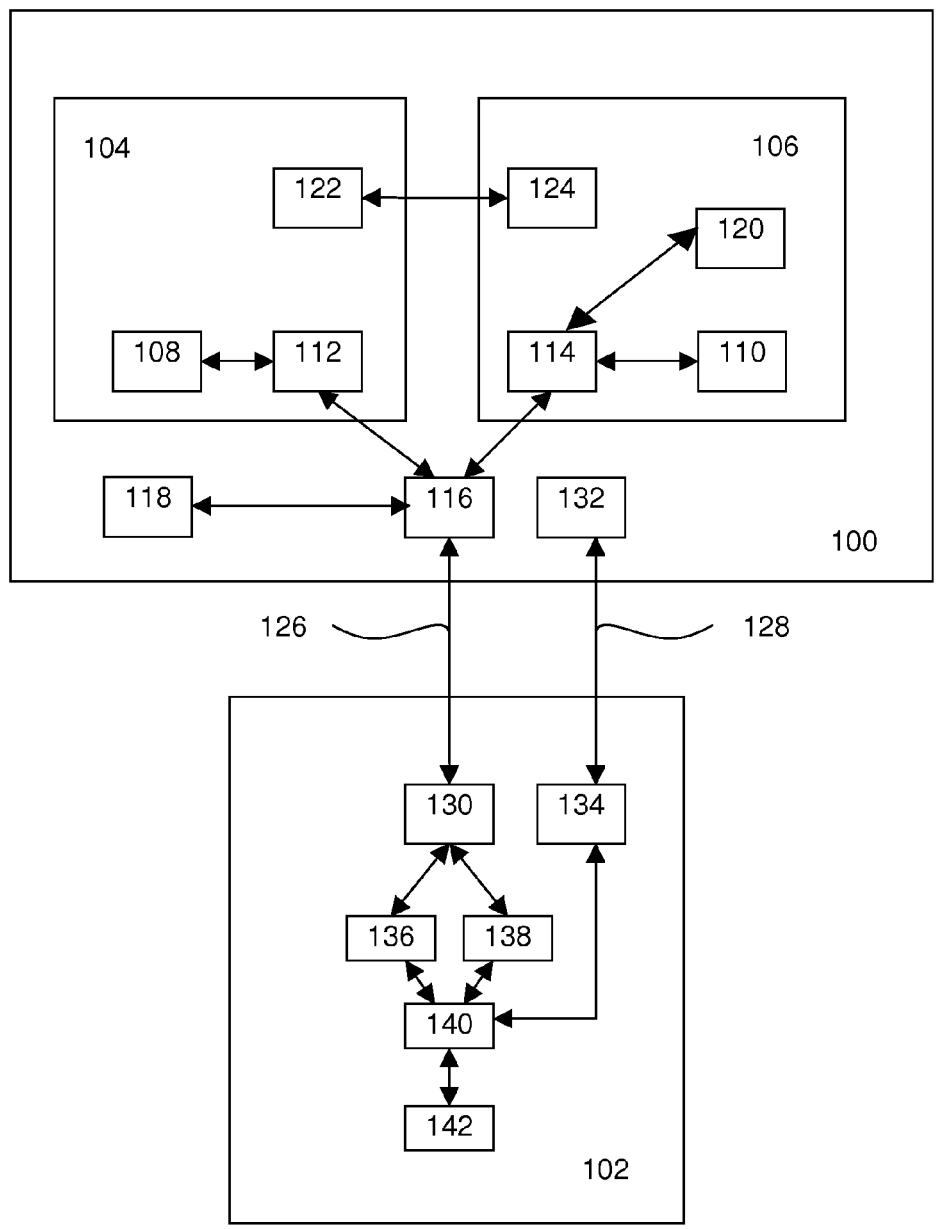
FIG. 1 shows an exemplary first communication system with a modem device embodiment and a terminal device.

FIG. 1 shows an exemplary communication system comprising an embodiment of a modem device 100 as well as a terminal device 102. In one example, the modem device 100 is configured as a network card, and the terminal device 102 is configured as a laptop having a standard slot for receiving the network card.

The modem device 100 comprises two mobile platform modules 104, 106 each supporting one or more RATs and each realized in the form of a separate platform module chip. Support for a specific RAT includes the provision of at least one dedicated baseband processor 108, 110 for this RAT on the respective platform module 104, 106. Each platform module 104, 106 may further comprise dedicated RF components (such as RF amplifiers), or such RF components may be jointly used by the platform modules 104, 106. In some embodiments, the platform module 106 may be substituted by an application platform module, and the associated baseband processor 110 with an application processor. Moreover, an application platform comprising an application processor could also be added to the modem device 100 and coupled with the platform module 106.

The platform module 106 may be provided in the form of a platform main chip supporting one or more existing or legacy RATs such as EDGE, WCDMA, GSM or High Speed Packet Access (HSPA) radio technologies. The other platform module 104 may be provided in the form of a platform co-chip supporting one or more novel RATs such as LTE or evolved HSPA (eHSPA).

The provision of two separate platform modules 104, 106 has some crucial advantages such as an increased flexibility and a reduced time-to-market. The higher flexibility results from the modular approach which permits to selectively implement the platform modules 104, 106 either in stand-alone solutions or in dual-mode solutions as shown in FIG. 1. The reduced time-to-market is a consequence of the decreased complexity resulting from distributing support for different RATs among different platforms modules 104, 106.

The mobile platform modules 104, 106 comprise a plurality of interfaces. First of all, each platform module 104, 106 comprises a data interface 112, 114 towards the terminal device 102. The data interfaces 112, 114 are configured to be used by the terminal device 102 to obtain network access via the one or more RATs supported by each platform module 104, 106. In one implementation, the data interfaces 112, 114 are realized in accordance with the USB standard. Specifically, the data interfaces 112, 114 may be configured in accordance with a USB device class presenting the modem device 100 as an Ethernet network card towards the terminal device 102. Suitable USB device classes providing Ethernet via USB include, for example, USB CDC ECM, USB CDC EEM, USB CDC ENCM, and USB NCM.

In addition (or alternatively) to presenting itself as a USB Ethernet network card towards the terminal device 102, the device 100 may present itself also as an USB mass storage or as any USB audio/video/multimedia device to the terminal device 102.

It should be noted that the data interfaces 112, 114 towards the terminal device 102 need not necessarily be configured in accordance with the USB standard. Other possible interface standards include the Universal Asynchronous Receiver/Transmitter (UART) standard or any proprietary standard. The differentiation between data interfaces on the one hand and control interfaces on the other hand mainly relates to the transferred information type. While data are generally generated or requested by a user or a user application, control information is typically only exchanged between lower layer components.

In the embodiment of FIG. 1, the two data interfaces 112, 114 are connected to respective internal interfaces (not shown in FIG. 1) of a USB switching hub 116. The hub 116 presents the two data interfaces 112, 114 in the form of a single physical data port (also not shown in FIG. 1) towards the terminal device 102. Accordingly, while there exist two logical USB Ethernet devices (in the form of the data interfaces 112, 114) on the two platform modules 104, 106, only a single physical USB port will be presented towards the terminal device 102.

The hub 116 comprises switching logic (not shown in FIG. 1) realizing switching mechanisms to selectively couple the data interface 112 of the platform module 104 via the internal interfaces of the hub 116 to either the data interface 114 of the platform module 106 or to the terminal device 102. The switching state of the hub 116 is controlled by a controller 118 residing anywhere within the modem device 100 (for example on one or both of the platform modules 104, 106).

In a first switching state of the hub 116, the data interface 112 of the platform module 104 is coupled, via the hub 116, to the data interface 114 of the platform module 106. In this state, an application 120 residing on the platform module 106 obtains network access via the RAT supported by the platform module 104. It should be noted that the application 120 need not necessarily be deployed within the platform module 106, but could also be deployed on an application platform module coupled to the mobile platform module 106.

In a second switching state of the hub 116, the data interface 112 of the mobile platform module 104 is connected to the USB port of the hub 116 that is directed towards the terminal device 102. In this switching state, network access in accordance with the RAT supported by the platform module 104 is provided to the terminal device 102.

In an optional third switching state, the data interface 112 of the platform module 104 is concurrently coupled to the data interface 114 of the platform module 106 and to the terminal device 102. Accordingly, both the mobile application 120 and an application on the terminal device 102 are concurrently provided with network access via the RAT supported by the platform module 104.

There may exist further switching states in which the data interface 114 of the platform module 104 is directly connected to the external device 102 without any hub in between. Such a configuration may be required for example in context with the PictBridge protocol in the case the external device 102 is configured as a printing device not capable of handling USB hubs.

In addition to the data interfaces 112, 114 towards the terminal device 102, the mobile platform modules 104, 106 comprise inter-platform control interfaces 122, 124. The inter-platform control interfaces 122, 124 will be utilized for the exchange of control signalling between the two platform modules 104, 106. Such control signalling may include Internal RAT (I RAT) synchronization, I RAT handover, Subscriber Identity Module (SI M) access from one platform module to the other platform module (in such a case only a single one of the two mobile platform modules 104, 106 needs to provide SIM access functionalities), and system control signalling including platform module wake-up functionalities. The control interfaces 122, 124 can be configured in accordance with the URAT standard, the USB standard, the General Purpose Input/Output (GPI O) standard or any proprietary standard. In the case the control interfaces 122, 124 are configured in accordance with the USB standard, they may at the same time be utilized for inter-platform data transfer.

The modem device 100 communicates with the terminal device 102 via a data connection 126 on the one hand and a control connection 128 on the other. The data connection 126 stretches from the physical port of the USB hub 116 to a physical USB port 130 of the terminal device 102. The control connection 128, on the other hand, stretches between a control interface 132 of the modem device 100 and a corresponding control interface 134 of the terminal device 102. The control interfaces 132, 134 may be configured in accordance with the UART standard or any proprietary standard. Alternatively, the control interfaces 132, 134 could be omitted, and control signalling could be exchanged via the link between the port provided by the USB hub 116 and the USB port 130 of the terminal device 102.

As shown in FIG. 1, the terminal device 102 comprises a first data interface 136 and a second data interface 138 which are adapted to be coupled to the modem device 100 to obtain network access via the RATs supported by the modem device 100. Specifically, the first data interface 136 is a logical USB interface adapted to be coupled to the corresponding USB data interface 112 of the platform module 104 to obtain network access via the one or more RATs provided by the platform module 104. The second data interface 138, on the other hand, is a logical USB data interface adapted to be coupled to the corresponding USB interface 114 of the platform module 106 to obtain network access via the one or more RATs provided by the platform module 106.

The terminal device 102 further comprises an interface driver 140 adapted to bind the first data interface 136 and the second data interface 138 of the terminal device 102 into one logical network interface. As a consequence, any application 142 of the terminal device 102 requiring network access will not see the two separate data interfaces 112, 114 of the modem device 100, but will only see a single logical network interface provided by the interface driver 140.

The interface driver 140 is coupled to the control interface 134 to receive control information indicative of the availability of the RATs supported by the platform modules 104, 106. The interface driver 140 will thus selectively switch either to the first data interface 112 or to the second data interface 114 depending on the control information received via the control interface 134. The control information may again be generated by the controller 118 of the modem device 100.

Figure 2:
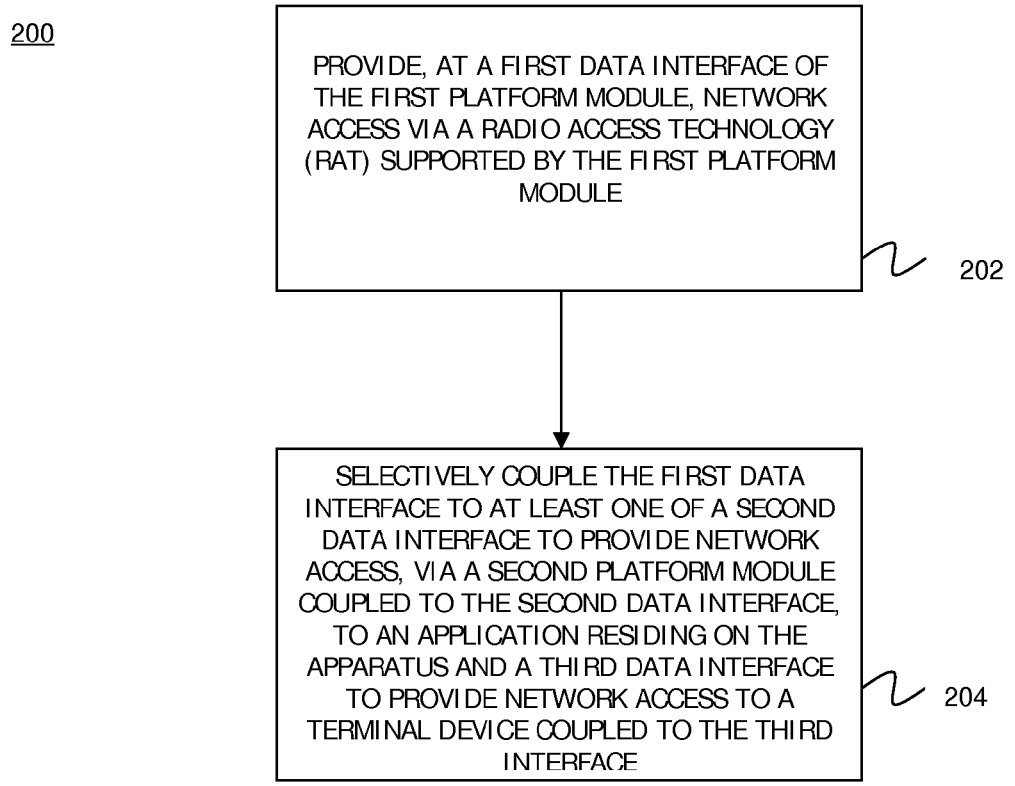
FIG. 2 schematically shows a flow diagram according to a method embodiment.

A flow diagram 200 shown in FIG. 2 illustrates in the form of a method embodiment the basic operations of the modem device 100 illustrated in FIG. 1.

With respect to the flow diagram 200 of FIG. 2, the operation of the modem device 100 starts with the provision of network access via the RAT supported by the platform module 104 in step 202. As stated above, to this end the data interface 112 of the platform module 104 is implemented.

In a next step 204, the data interface 112 of the platform module 104 is selectively coupled, by the hub 116, to either the platform module 106 or to the terminal device 102 (or to both simultaneously). Specifically, in a first switching state the data interface 112 of the platform module 104 is coupled, via internal interfaces of the hub 116, to the data interface 114 of the platform module 106. In this switching state, network access can thus be provided to the application 120. In a second switching state, the data interface of the platform module 104 is connected via the appropriate internal interfaces of the USB hub 116 to the port 130 of the external device 102. In this switching state, the terminal device 102 is thus provided with network access.

Figure 3A:
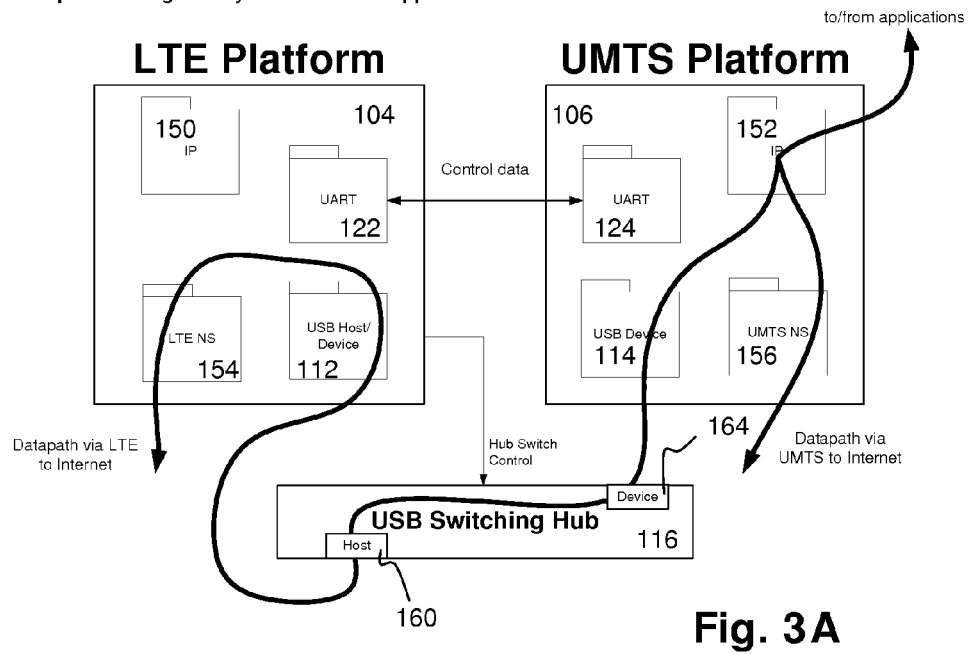
FIGS. 3A and 3B show an exemplary second communication system with a modem device embodiment and a terminal device in two different communication configurations.
Figure 3B:
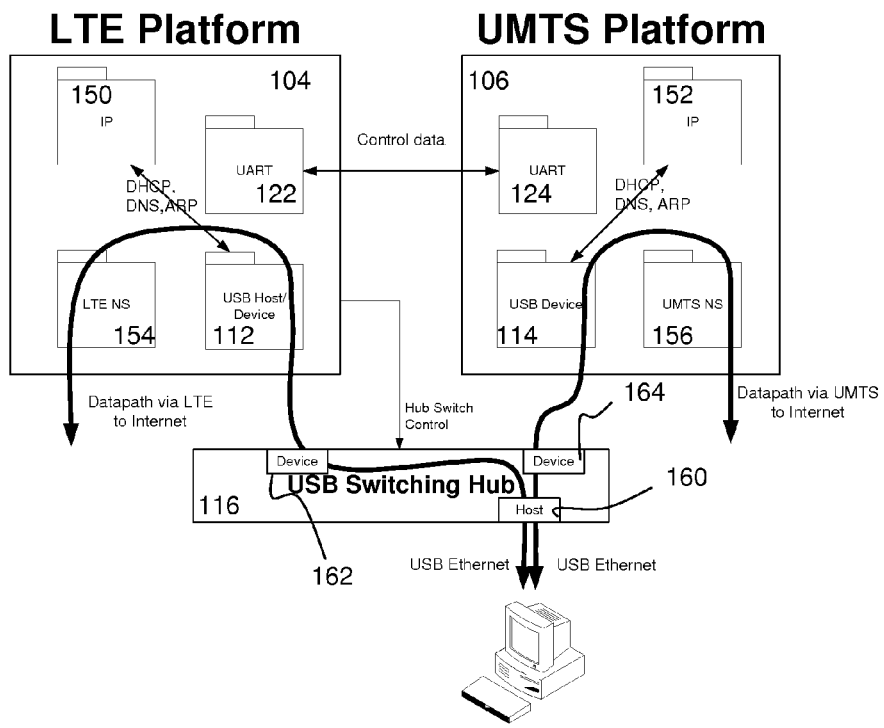

FIGS. 3A and 3B show in two different switching configurations a further system embodiment that may be derived from the system embodiment discussed above in context with FIG. 1. The same reference numerals will thus be used to identify the same or similar components.

In the embodiment shown in FIGS. 3A and 3B, the modem device 100 is again a dual-mode device comprising a first mobile platform module 104 supporting the LTE RAT and a second mobile platform module 106 supporting the UMTS RAT. In addition to the components already discussed in context with FIG. 1 (and which are therefore partly not shown in FIGS. 3A and 3B), each platform module 104, 106 additionally comprises a network address management component 150, 152 in the form of an IP module with IP layer functionalities. The network address management components 150, 152 are configured to communicate with each other via UART control interfaces 122, 124. This inter-platform control communication between the two network address management components 150, 152 aims at synchronizing the IP stacks maintained by each network address signalling component 150, 152. Such a synchronization includes the transfer of an IP address, that has been allocated by the network, between the respective IP stacks. After the IP stack synchronization, the two mobile platform modules 104, 106 will act towards the outside world (i.e., towards the network and towards the terminal device 102), as if the modem device 100 had only a single IP stack (and a single IP address).

As can be gathered from FIGS. 3A and 3B, each platform module 104, 106 further comprises a network signalling module 154, 156 that constitutes an interface towards the associated access network. The network signalling modules 154, 156 are in charge of the signalling required to establish and maintain a network connection (e.g., a connection to the Internet) via the associated RAT.

Each of the mobile platform modules 104, 106 provides a USB interface 112, 114, respectively, to the interface driver (not shown in FIGS. 3A and 3B) of the terminal device 102. The UMTS platform module 104 is configured to present itself as USB Ethernet Network Access Point (NAP) device to the interface driver giving the terminal device 102 (USB host) network access using UMTS RAT via USB Ethernet. In a similar manner, the LTE platform module 106 is configured to present itself, via the USB interface 114, as USB Ethernet NAP device to the interface driver, thus giving the terminal device 102 Internet access using LTE RAT via USB Ethernet. The interface driver of the terminal device 102 is adapted to bind these two USB Ethernet devices presented by the two data interfaces 112, 114 into one logical network interface with the same IP address. Accordingly, an operating system (with an associated IP stack) of the terminal device 102 and an application running on the operating system will only see a single network device instead of two dedicated mobile platform modules 104, 106.

An aspect that should be mentioned with respect to the system embodiment shown in FIGS. 3A and 3B is the fact that the data path within each individual mobile platform module 104, 106 may include an IP shortcut between the data interfaces 112, 114 on the one hand and the network signalling modules 154, 156 on the other. This shortcut constitutes a direct link for IP packets bypassing the respective network address management component 150, 152. Basically, these components 150, 152 only have to be included in the data path in case of IP packets involving for example the Address Solution Protocol (ASP), the Dynamic Host Configuration Protocol (DHCP) and the Domain Name System (DNS) standard. In case the IP shortcut illustrated in FIGS. 3A and 3B is not implemented, all IP packets are routed through the associated network address management component 150, 152.

Figure 4:
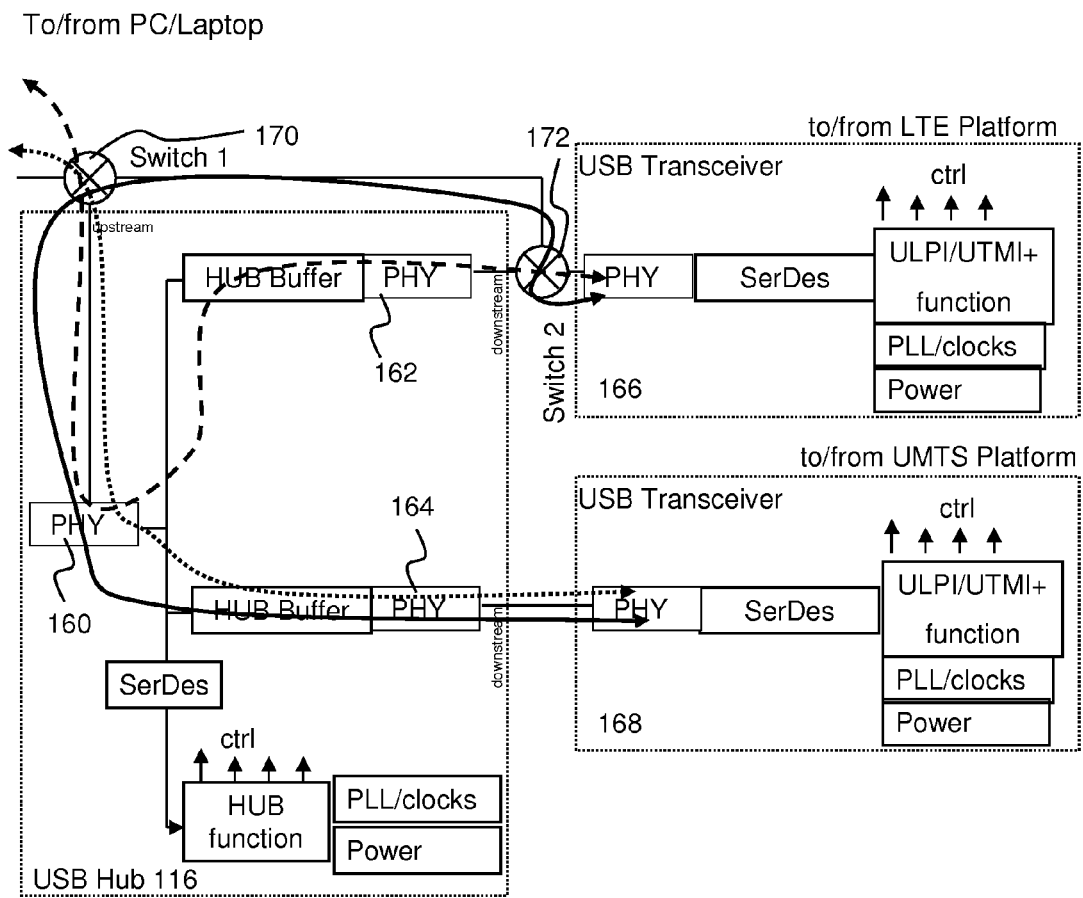
FIG. 4 shows the configuration of a switching hub for use in connection with any modem device.

FIG. 4 illustrates the internal components of the USB switching hub 116 shown in FIGS. 3A and 3B. As shown in FIG. 4, the hub 116 basically provides conventional hub functionalities at three physical data interfaces 160, 162, 164. The hub 116 can be coupled with a first USB transceiver 166 (to be coupled with the data interface 112 of the LTE platform module 104) and a second USB transceiver 168 (to be coupled with the data interface 114 of the UMTS platform module 106). Additionally, two switches 170 and 172 are included in or coupled to the hub 116. The switching states of the two switches 170, 172 may be controlled by the controller 118 shown in FIG. 1 as will be discussed in more detail below.

The USB hub 116 further comprises two buffers associated with the data interfaces 162, 164 facing the USB transceivers 166, 168, a serializing/de-serializing component, a hub controller function, a Phase-Locked Loop (PLL)/clocking component and power supply circuitry well known in the art. These components are thus not described further here. In a similar manner, each of the USB transceivers 166, 168 includes a serializing/de-serializing component, an USB 2.0 Transceiver Macrocell Interface extension supporting on-the-go (UTMI+) and/or an UMTI+Low Pin Interface (ULPI) controller function, a PLL/clocking component as well as power supply circuitry. These components are also well known in the art and thus not described in more detail here.

The USB hub 116 illustrated in FIG. 4 may be realized (optionally together with the switches 170, 172 and/or the transceivers 166, 168) in the form of a single integrated circuit. Alternatively, the hub 116 may be integrated together with the LTE platform module 104 in a single ASI C. This ASIC may optionally also include the controller 118 of FIG. 1 and the switches 170, 172 and transceiver 166, 168 of FIG. 4. For the sake of clarity, only the interfaces 160, 162 and 164 of the hub 116 are shown in FIGS. 3A and 3B. The USB transceivers 166, 168 as well as the switches 170, 172, although also present, have been omitted in these drawings.

As shown in FIG. 4, a first data interface 160 of the USB hub 116 can be coupled via a first switch 170 to the terminal device 102 (via the transceiver 166). A second data interface 162 can be coupled via a second switch 172 to the USB transceiver 166 facing the LTE platform module 104, and a third interface 164 is coupled to the USB transceiver 168 facing the UMTS platform module 106. The data interface 160 towards the terminal device 102 realizes an upstream (host) port, and a two remaining data interfaces 162, 164 realize downstream (device) ports.

The switching logic implemented by the two switches 170, 172 is configured to selectively assume one of two switching states. In the first switching state (illustrated in FIG. 4 by the arrow with a full line and also depicted in FIG. 3A) relates to the case in which the LTE platform module 104 is connected to the data interface 160 (upstream port) and the UMTS platform module 106 is connected to the data interface 164 (downstream port) of the USB hub 116. The first switching state is assumed when a local application residing on top of the UMTS platform module 106 obtains network access via the LTE RAT provided by LTE platform module 104 ("mobile application use case").

In the second switching state (indicated by the arrows in broken and dotted lines in FIG. 4 and also shown in the scenario of FIG. 3B) is assumed when a terminal device 102 such as a personal computer or a laptop is connected to the upstream port represented by the data interface 160 of the USB hub 116 and when both the LTE platform module 104 and the UMTS platform module 106 are connected to the downstream ports represented by the data interfaces 162, 164, respectively, of the USB hub 116. The second switching state is assumed to provide the terminal device 102 with network access via one or both of the LTE RAT and the UMTS RAT. As mentioned above, the modem device 100 will in this case function as an USB Ethernet device ("USB Ethernet used case").

The switching between the two states illustrated in FIGS. 3A, 3B and 4 is performed depending on the specific use case. The switching may be controlled depending on the detection of whether or not an external USB host (terminal device 102) is connected to the modem device 100. The corresponding control signalling can be initiated by the LTE platform module 104 as illustrated in FIGS. 3A and 3B (in this case the controller 118 of FIG. 1 would at least partially reside on the LTE platform module 104).

As illustrated in FIGS. 3A and 3B, the data interface 112 of the LTE platform module 104 is switchable between a device mode and a host mode. For this reason, the USB switching hub 116 is configured to support the parallel connection of the shared USB device/host interface 112 of the LTE platform module 104 to the host port (data interface 160) and to the associated device port (data interface 162) of the USB switching hub 116 as illustrated in FIG. 4.

In the mobile application use case of FIG. 3A, the data interface 112 is operated in the host mode and connected to the data interface 114 of the UMTS platform module 106 (which is operated in the device mode). In the USB Ethernet use case shown in FIG. 3B, the data interface 112 is operated in the device mode and connected to the USB port (see reference numeral 130 in FIG. 1) of the terminal device 102, which is operated in the host mode. As mentioned above, the data interface 114 of the UMTS platform is operated in the device mode and connected to the external USB host (terminal device 102) in the USB Ethernet use case of FIG. 3B.

In the following, a concurrent combination of the mobile application use case shown in FIG. 3A and the USB Ethernet use case shown in FIG. 3B will be described in more detail with reference to FIGS. 5 and 6. As regards the scenario shown in FIG. 5, it will be assumed that an application residing on (or within) the UMTS platform module 106 requires only low rate data services via the LTE RAT. Such low rate data services like voice-over-IP calls may be provided by an IP Multimedia Sub-system (IMS) in the core network.

Figure 5:
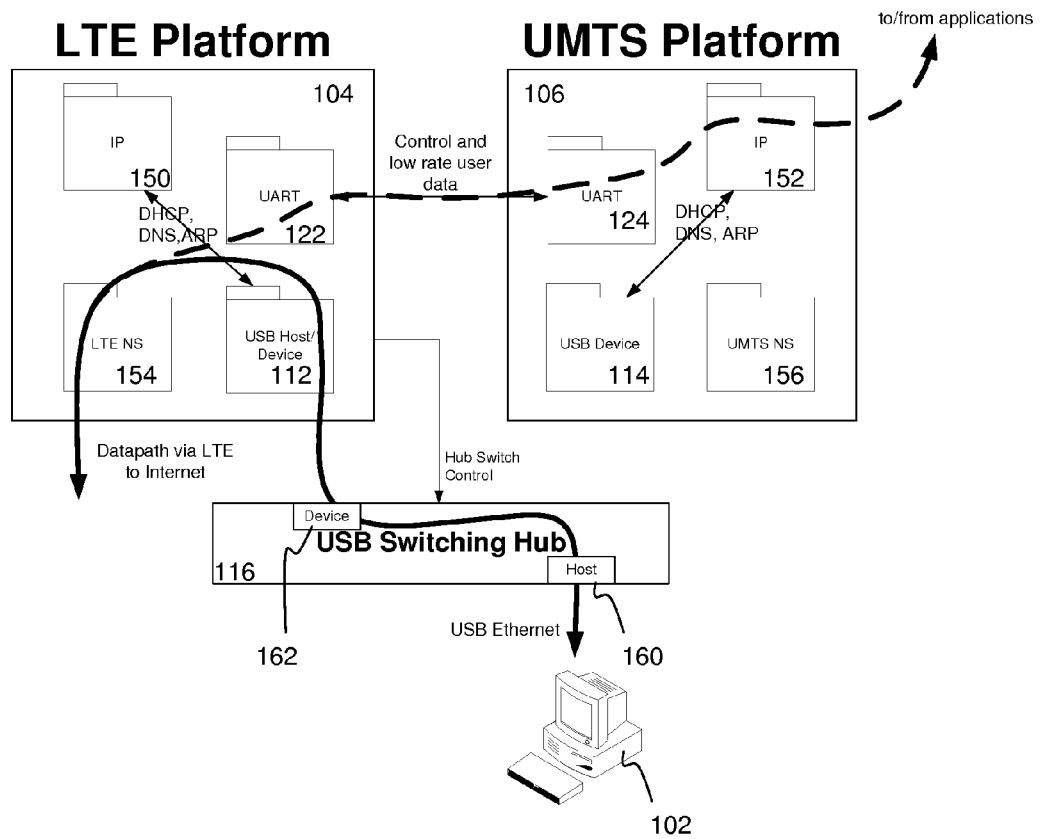
FIG. 5 shows a third communication configuration of the communication system of FIGS. 3A and 3B.

As illustrated in FIG. 5, the data path for such low rate data services may employ the inter-platform control interfaces 122, 124, which are normally used for transferring interplatform control signalling. In the combined use case illustrated in FIG. 5, low rate LTE data to and from mobile applications residing on the UMTS platform module 106 are thus routed via the control interfaces 122, 124 to and from the UMTS platform module 106, whereas high rate LTE data are routed via the data interface 112 (USB device mode) to and from the terminal device 102 (external USB host).

It should be noted that the control interfaces 122, 124 are typically not adapted to support high data rates. For this reason, the scenario illustrated in FIG. 5 would not be applicable in cases in which mobile applications residing on the UMTS platform module 106 require a data rate which is too high to be transferred on the control interfaces 122, 124. In such cases, data could be routed from the LTE platform module 104 through the terminal device 102 to the UMTS platform module 106, and vice versa, by introducing a data bridge functionality in the interface driver (USB host driver; see reference numeral 140 in FIG. 1) of the terminal device 102. The corresponding data path is illustrated in FIG. 6.

Figure 6:
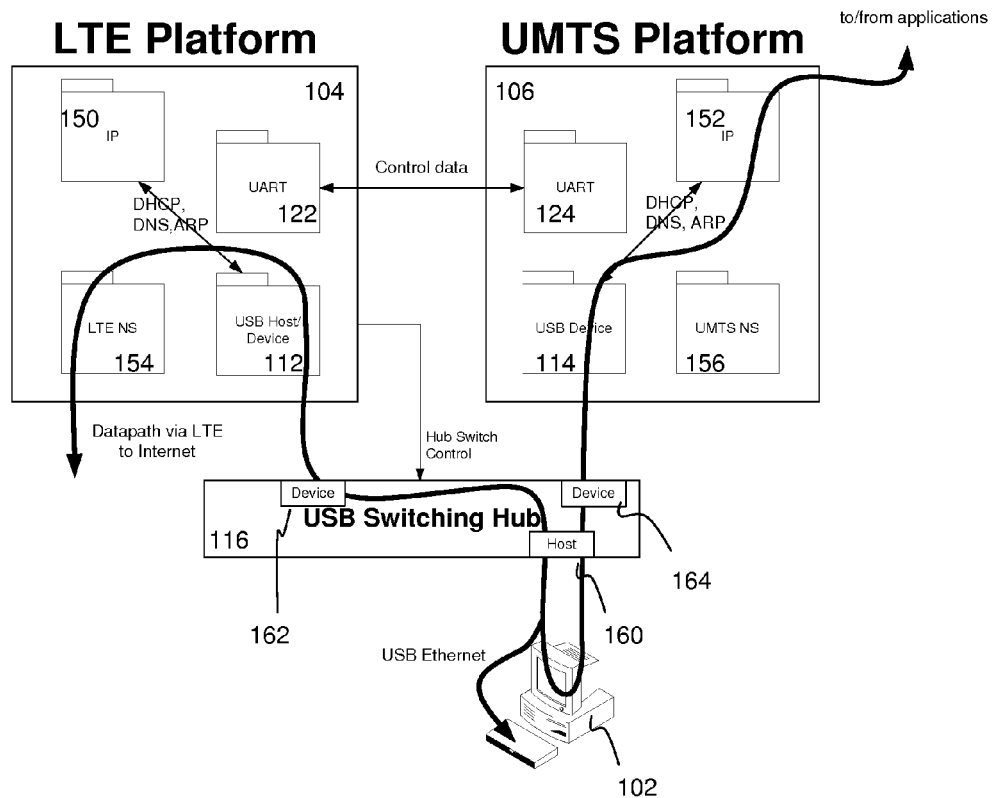
FIG. 6 shows a fourth communication configuration of the communication system of FIGS. 3A and 3B.

As regards the scenario illustrated in FIG. 6, uplink data transfer and downlink data transfer will be treated differently. In the downlink direction, the LTE platform module 104 transmits both, the LTE data for the USB Ethernet service as well as the LTE data for mobile applications, to the terminal device 102. The interface driver of the terminal device 102 will separate both LTE data streams and forward the LTE data for the USB Ethernet service to the local applications of the terminal device 102, while the LTE data for the mobile applications will be bridged and forwarded (via the hub 116) to the UMTS platform module 106.

In the uplink direction, the interface driver of terminal device 102 has to combine the data from the local applications and the data from the mobile applications. The combined data will then be forwarded, via the hub 116, to the LTE platform module 104.

As one option, the control interfaces 122, 124 illustrated in FIGS. 1, 3A, 3B, 5 and 6 could be omitted by routing control signalling between the LTE platform module 104 and the UMTS platform module 106 via the terminal device 102 in a similar manner as illustrated in FIG. 6.

As a further option, also the UMTS platform module 106 could take the host role for the USB connection between the LTE platform module 104 and the UMTS platform module 106. In this case, the data interface 114 of the UMTS platform module 106 will be configured as an USB interface which can be selectively operated in a device mode and in a host mode. If the data interface 114 is operated in the device mode (USB Ethernet use case), it is connected to the external USB host (terminal device 102). If it is operated in the host mode (mobile application use case) it is connected to the data interface 112 of the LTE platform module 104. The data interface 112 of the LTE platform module will in this case be configured as a USB device interface.

Moreover, the switching state of the hub 116 could also be controlled by the UMTS platform module 106 instead of by the LTE platform module 104, or by a separate controller of the modem device 100 neither residing on the LTE platform module 104 nor on the UMTS platform module 106 (see controller 118 in FIG. 1).

As has become apparent from the above description of several embodiments, it is advantageous to provide a switching hub 116 between the mobile platform modules 104, 106 and the terminal device 102. Such a solution avoids the drawbacks associated with scenarios as illustrated in FIGS. 7A and 7B in which the switching hub 116 is not present.

Figure 7A:
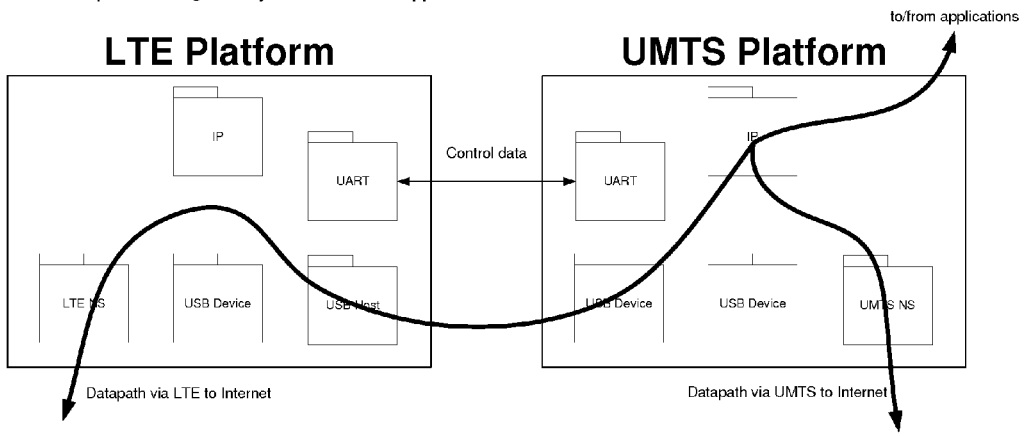
FIGS. 7A and 7B show a dual platform module modem device with inter-platform module data interfaces and additional data interfaces towards a terminal device in two different communication configurations.
Figure 7B:
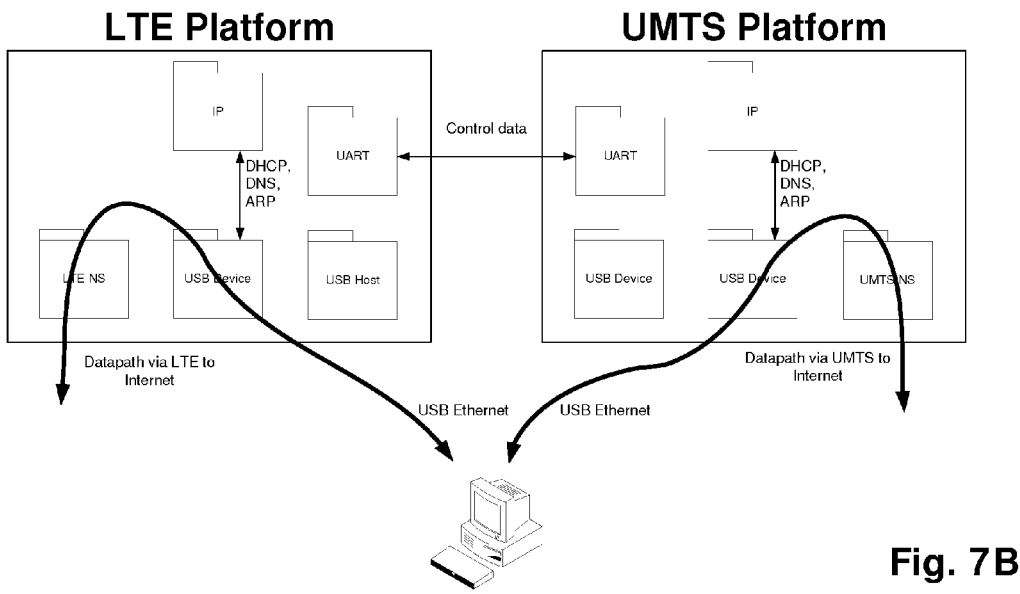

As shown in FIGS. 7A and 7B, the UMTS platform module implements one USB device interface to the terminal device, one USB device interface to the LTE platform module for inter-platform data transfer and an UART control interface for inter-platform control signalling. The LTE platform module also implements one USB device interface to the terminal device, one USB host interface to the UMTS platform module for inter-platform data transfer, as well as an UART control interface for inter-platform control signalling. The scenario illustrated in FIGS. 7A and 7B has the drawback that each platform module requires two dedicated USB interfaces. The second USB interface of each platform occupies additional ASIC area of the corresponding platform module and increases the production costs. Moreover, since both platform modules could also be used in stand-alone deployments, there will often be no need for the second USB interface at all.

In relation to the scenarios illustrated in FIGS. 7A and 7B, the solution presented by the embodiments has the advantage that only one USB interface is needed on each platform module. This fact saves ASIC area and therefore production costs. If the LTE platform module is connected to another platform module which supports anyhow more than one USB interface, the remaining USB interface of the other platform can be used for other purposes, such as a connection to Ultra-Broadband (UBB) chips or to a USB Universal Integrated Circuit Card (UI CC). Another advantage results from a lower power consumption as no inter-platform module data interface needs to be powered up because each platform module can autonomously handle the user data transfer to the external device.

The solution of having platform module-specific data interfaces towards the terminal device also simplifies other platform module-specific functionalities via these data interfaces, such as debugging, flashing, data mass storage and the like. Moreover, existing software tools for these purposes can be reused as each platform module can be accessed separately.

Also, the development efforts inside the platform modules are decreased as the data path is the same as for conventional stand-alone cases (i.e., as for modem devices comprising only a single mobile platform module). There is thus no need to implement a specific user data path for the case in which one mobile platform module handles the interface towards the terminal device and the other mobile platform module handles the network access.

It is believed that many advantages of the present invention will be fully understood from the forgoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. An apparatus for providing network access, the apparatus comprising:
   a first platform module adapted to support network access via a first Radio Access Technology (RAT) and comprising a first data interface that is selectively operable in a device mode and in a host mode;
   a second data interface adapted to be coupled to a second platform module;
   a third data interface adapted to be coupled to an external device;
   a first switching mechanism adapted to select from among the second data interface and the third data interface to selectively couple the first data interface to at least one of:
      the second data interface to provide network access, via the second platform module, to an application residing on the apparatus; and
      the third data interface to provide network access to the external device; and
   a control mechanism adapted to operate the first data interface in the host mode when the first data interface is coupled via the second data interface to the application, and in the device mode when the first data interface is coupled via the third interface to the external device.

2. The apparatus of claim 1, wherein the control mechanism is further adapted to detect whether or not the external device is connected to the apparatus via the third interface, and to control the first switching mechanism dependent on a result of this detection.

3. The apparatus of claim 1, further comprising a second switching mechanism adapted to couple the second data interface to the third data interface.

4. The apparatus of claim 2, wherein the control mechanism also controls the second switching mechanism dependent on the result of the detection of whether or not the external device is connected to the apparatus via the third interface.

5. The apparatus of claim 4, wherein the control mechanism is further adapted to control the second switching mechanism to couple the second data interface to the third data interface and to control the first switching mechanism to couple the first data interface to the third data interface to provide the application with network access via the first RAT, wherein network traffic between the first data interface and the second data interface is routed through the external device.

6. The apparatus of claim 1, wherein the first platform module comprises a first control interface and wherein the second platform module comprises a second control interface.

7. The apparatus of claim 6, wherein the first control interface and the second control interface are adapted for the transfer of both control signalling and network traffic between the first platform module and the second platform module.

8. The apparatus of claim 7, wherein network traffic between the first control interface and the second control interface is enabled when the first data interface is coupled to the third data interface to provide concurrent network access via the first RAT to the external device and to the second platform module.

9. The apparatus of claim 1, further comprising a network traffic splitter/combiner located between the first data interface on the one hand and, on the other hand, the application and the external device.

10. The apparatus of claim 1, further comprising a switching hub comprising the second data interface and the third data interface, and further comprising a fourth data interface adapted to be coupled to the first interface.

11. The apparatus of claim 10, wherein the first platform module, the switching hub and one or more of the switching mechanisms are integrated in an Application Specific Integrated Circuit (ASIC).

12. The apparatus of claim 1, wherein at least one of the first, the second and the third data interface is a Universal Serial Bus (USB) interface.

13. The apparatus of claim 1, further comprising the second platform module.

14. The apparatus of claim 13, wherein the second platform module is adapted to support network access via at least one second RAT.

15. The apparatus of claim 13, further comprising an application processor coupled to or included in the second platform module.

16. The apparatus of claim 1, wherein at least one of the first platform module and the second platform module comprises a digital baseband processor configured in accordance with at least one of the first RAT and a second RAT, respectively.

17. The apparatus of claim 1, wherein the apparatus is configured as at least one of a mobile terminal, a mobile telephone and a network card, or as an ASIC for use in a mobile terminal, a mobile telephone or a network card.

18. A method of providing network access by an apparatus having a first platform module and a second platform module, the method comprising:
providing, at a first data interface of the first platform module, network access via a Radio Access Technology (RAT) supported by the first platform module;
selecting from among a second data interface and a third data interface to selectively couple the first data interface to at least one of:
the second data interface to provide network access, via a second platform module coupled to the second data interface, to an application residing on the apparatus; and
the third data interface to provide network access to an external device coupled to the third interface; and
operating the first data interface in a host mode when the first data interface is coupled via the second data interface to the application, and in a device mode when the first data interface is coupled via the third data interface to the external device.

19. The method of claim 18, further comprising detecting the presence of the external device at the third data interface and in response to a detected presence of the external device coupling the first data interface to the third data interface.

20. The method of claim 18, further comprising receiving a network access request from the second platform module and coupling the first data interface to the second data interface.

21. The method of claim 18, further comprising coupling the second data interface to the third data interface and coupling the first data interface to the third data interface to provide the application with network access via the first RAT, wherein network traffic between the first data interface and the second data interface is routed through the external device.

22. A non-transitory computer-readable recording medium having stored thereon program code portions for performing a method of providing network access by an apparatus having a first platform module and a second platform module, the method comprising:
providing, at a first data interface of the first platform module, network access via a Radio Access Technology (RAT) supported by the first platform module;
selecting from among a second data interface and a third data interface to selectively couple the first data interface to at least one of:
the second data interface to provide network access, via a second platform module coupled to the second data interface, to an application residing on the apparatus; and
the third data interface to provide network access to an external device coupled to the third interface; and
operating the first data interface in a host mode when the first data interface is coupled via the second interface to the application, and in a device mode when the first data interface is coupled via the third data interface to the external devices.

* * * * *